US011813673B2

(12) United States Patent
Lucchetti et al.

(10) Patent No.: US 11,813,673 B2
(45) Date of Patent: Nov. 14, 2023

(54) METHOD FOR THE PRODUCTION OF A CYLINDER HEAD FOR AN INTERNAL COMBUSTION ENGINE

(71) Applicant: FERRARI S.p.A., Modena (IT)

(72) Inventors: Daniele Lucchetti, Modena (IT); Federico Pineschi, Modena (IT); Lorenzo Bongiorni, Modena (IT); Franco Pinna, Modena (IT); Marco Ricci, Modena (IT)

(73) Assignee: FERRARI S.p.A., Modena (IT)

( * ) Notice: Subject to any disclaimer, the term of this patent is extended or adjusted under 35 U.S.C. 154(b) by 172 days.

(21) Appl. No.: 17/338,965

(22) Filed: Jun. 4, 2021

(65) Prior Publication Data
US 2021/0394266 A1  Dec. 23, 2021

(30) Foreign Application Priority Data

Jun. 17, 2020 (IT) .................. 102020000014458

(51) Int. Cl.
*B22F 7/08* (2006.01)
*B33Y 10/00* (2015.01)
(Continued)

(52) U.S. Cl.
CPC ............... *B22F 7/08* (2013.01); *B22F 5/008* (2013.01); *B22F 10/28* (2021.01); *B22F 10/80* (2021.01);
(Continued)

(58) Field of Classification Search
CPC .. B22F 5/008; B22F 7/08; B22F 10/28; B22F 10/80; B33Y 10/00; F02F 1/24
See application file for complete search history.

(56) References Cited

U.S. PATENT DOCUMENTS 10,207,325 B2 * 2/2019 Zink .................. F23R 3/28
2008/0017346 A1 1/2008 Bassi
(Continued)

FOREIGN PATENT DOCUMENTS

DE   102005059309 A1 * 11/2007 ........... B32B 15/016
DE   102009021471 A1   12/2010
(Continued)

OTHER PUBLICATIONS

DE-102014204859-A1 English language translation (Year: 2015).*
Italian Search Report and Written Opinion for Application No. 202000014458, Search completed Dec. 20, 2020, 7 pages.

*Primary Examiner* — Sally A Merkling
*Assistant Examiner* — Sean P. O'Keefe
(74) *Attorney, Agent, or Firm* — CANTOR COLBURN LLP

(57) ABSTRACT

A method for the production of a cylinder head for an internal combustion engine. The production method presentes the steps of: dividing the cylinder head into a main part, where there is the flame deck making up the crown of each cylinder, and an operating part, where there are the housings of the control means of the valves; manufacturing, at first, the sole main part of the cylinder head by means of a casting process in a mould; and manufacturing, subsequently, the operating part of the cylinder head by means of additive manufacturing, which adds layer upon layer starting from the previously manufactured main part of the cylinder head.

19 Claims, 3 Drawing Sheets

(51) Int. Cl.
*B33Y 50/00* (2015.01)
*B33Y 80/00* (2015.01)
*B33Y 40/10* (2020.01)
*B22F 10/80* (2021.01)
*B22F 10/28* (2021.01)
*B22F 5/00* (2006.01)
*C22F 1/04* (2006.01)
*F02F 1/24* (2006.01)

(52) U.S. Cl.
CPC ............... *B33Y 10/00* (2014.12); *B33Y 40/10* (2020.01); *B33Y 50/00* (2014.12); *B33Y 80/00* (2014.12); *C22F 1/04* (2013.01); *F02F 1/24* (2013.01)

(56) References Cited

U.S. PATENT DOCUMENTS

| | | | | |
|---|---|---|---|---|
| 2018/0178327 A1* | 6/2018 | Smith | ................ | B23K 26/0626 |
| 2019/0218995 A1* | 7/2019 | Gadau | ....................... | F02F 1/40 |
| 2020/0018270 A1* | 1/2020 | Friske | ................. | F02M 35/104 |
| 2020/0040840 A1* | 2/2020 | Turner | .................. | B32B 15/016 |

FOREIGN PATENT DOCUMENTS

| | | | | |
|---|---|---|---|---|
| DE | 102014204859 A1 | | 9/2015 | |
| DE | 102017112216 A1 * | | 10/2017 | ............ B22F 3/1055 |
| DE | 102018120046 A1 * | | 2/2020 | ............... B22C 9/10 |
| JP | 2001355416 A * | | 12/2001 | ............ B22F 3/1055 |
| WO | 2014165734 A1 | | 10/2014 | |

\* cited by examiner

METHOD FOR THE PRODUCTION OF A CYLINDER HEAD FOR AN INTERNAL COMBUSTION ENGINE

CROSS-REFERENCE TO RELATED APPLICATIONS

This patent application claims priority from Italian patent application no. 102020000014458 filed on Jun. 17, 2020, the entire disclosure of which is incorporated herein by reference.

TECHNICAL FIELD

The invention relates to a method for the production of a cylinder head for an internal combustion engine.

PRIOR ART

An internal combustion engine generally comprises an engine block, where a plurality of cylinders are obtained, each provided with a respective combustion chamber and with a respective piston, which is mechanically connected to a crankshaft in order to transmit, to the crankshaft, the force generated by the combustion. The engine block is provided with at least one cylinder head, which makes up the crown of the cylinders (namely, the upper closing of the cylinders) and is designed to house the intake and exhaust valves as well as the corresponding control means (namely, return springs and camshafts).

Cylinder heads are currently made of steel (when weight reduction is less important) or of a light aluminium alloy (in case of high-performance engines, which require smaller weights).

Different technologies are available for manufacturing a partly finished cylinder head made of a light aluminium alloy: the traditional solution (as described, for example, in patent applications WO2005084851A1, DE102009021471A1, US2008017346A1 and DE102014204859A1) is a melting process, for example a casting process with a gravity system or at a low pressure (which can be a die casting or a sand casting), but, recently, additive manufacturing was also suggested as a possible solution, for it allows manufacturers to obtain particularly complex and light inner geometries (namely, having particularly thin wall thicknesses).

However, the use of additive manufacturing for manufacturing a partly finished cylinder head made of a light aluminium alloy has proved to be unsatisfying because of its long manufacturing times (and, hence, high manufacturing costs) due to the significant dimensions of the cylinder head and, especially, because of a small mechanical resistance of the cylinder head, which tends to break in areas close to the flame deck.

Patent application WO2014165734A1 describes a method for the production of a piston of an internal combustion engine; the piston comprises two pieces, which are joined to one another by means of a joint and are manufactured one by means of casting or forging and the other one through an additive manufacturing process.

DESCRIPTION OF THE INVENTION

The object of the invention is to provide a method for the production of a cylinder head for an internal combustion engine, which allows manufacturers to produce a cylinder head which, at the same time, is light and adequately resistant (especially in the area of the flame deck).

According to the invention, there is provided a method for the production of a cylinder head for an internal combustion engine according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
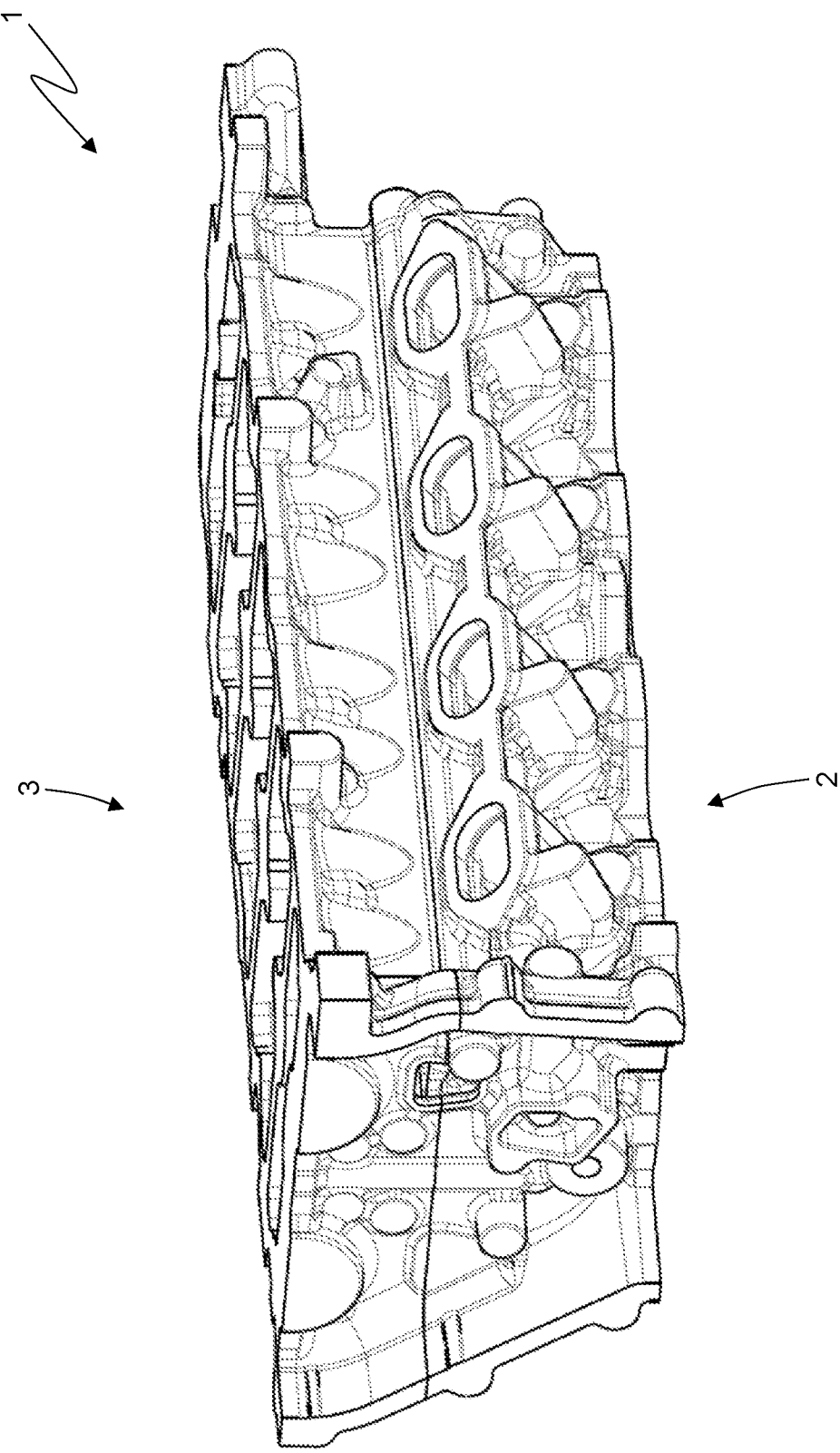
FIG. 1 is a schematic perspective view of a cylinder head of an internal combustion engine according to the invention.

In FIG. 1, number 1 indicates, as a whole, a cylinder head of an internal combustion engine.

The cylinder head 1 makes up the crown of the cylinders (namely, the upper closing of the cylinders) of the internal combustion engine and, hence, has the flame deck making up the crown of each cylinder; furthermore, the cylinder head 1 is designed to house the intake and exhaust valves and the corresponding control means (namely, return springs and camshafts) and, therefore, in the cylinder head 1 there are the housings of the intake and exhaust valves as well as the housings of the valve control means.

Figure 2:
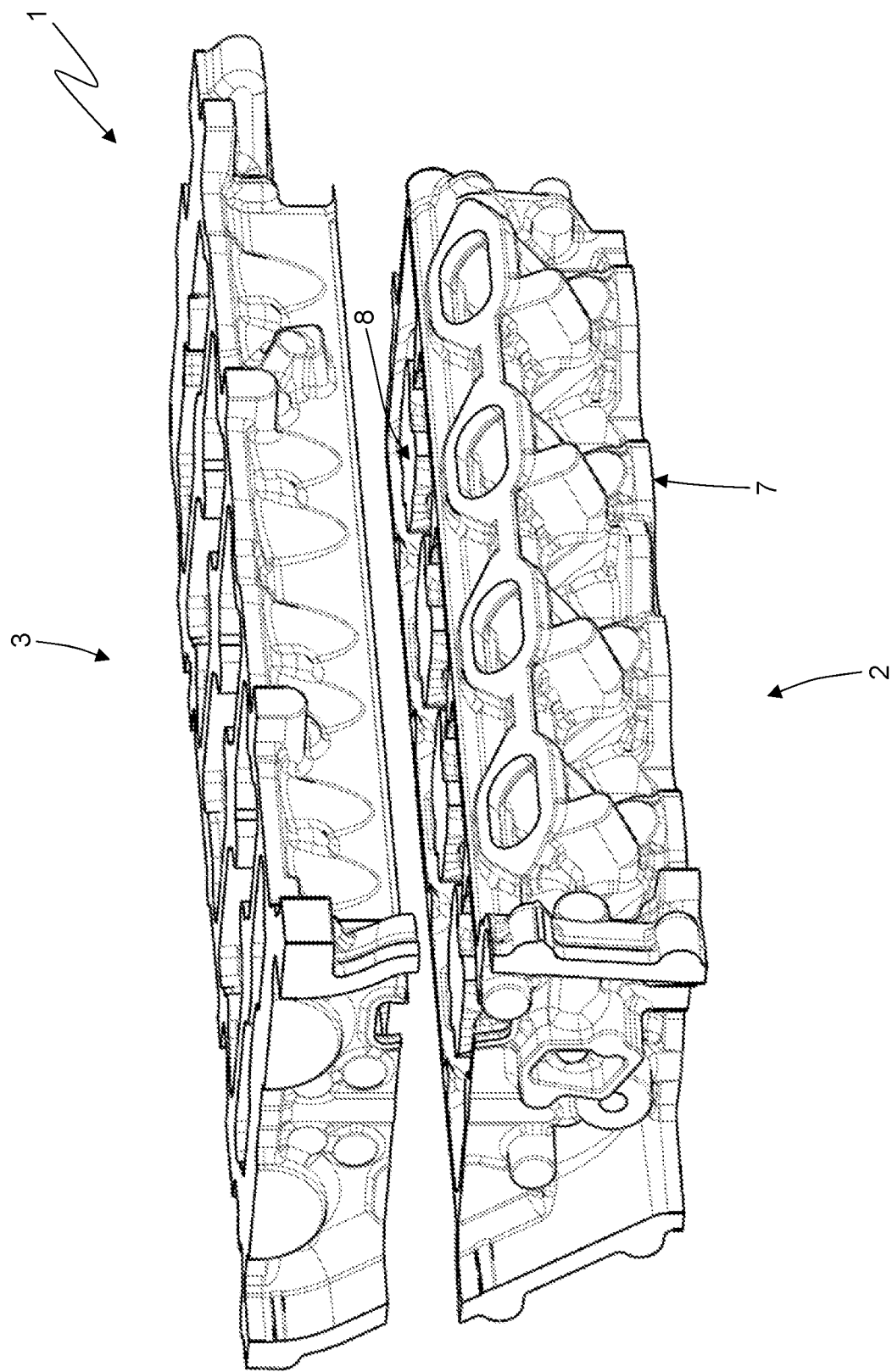
FIG. 2 is a schematic perspective and exploded view of the cylinder head of FIG. 1.

According to FIG. 2, in a preliminary stage (i.e. during the designing phase) the cylinder head 1 is divided into a main part 2, where there is the flame deck making up the crown of each cylinder, and an operating part 3, where there are the housings of the valve control means. In the cylinder head 1, the two parts 2 and 3 are connected to one another in a permanent and inseparable manner, namely the two parts 2 and 3 cannot be separated, if not by breaking or cutting the cylinder head 1.

In the main part 2 of the cylinder head 1 there is the area of the combustion chamber, in which, following the mechanical processing, the final surfaces will have to face the area where the combustion takes place; therefore, the mechanical and stress resistance features locally requested to the material will have to be very high.

In the operating part 3 of the cylinder head 1 there is the area of the camshaft, in which the design of the component normally comprises cavities and circuits with a particular shape, which is made necessary by lubrication and cooling circuits; hence, in the operating part 3 of the cylinder head 1, the necessary features basically are lightness and geometric complexity.

Figure 3:
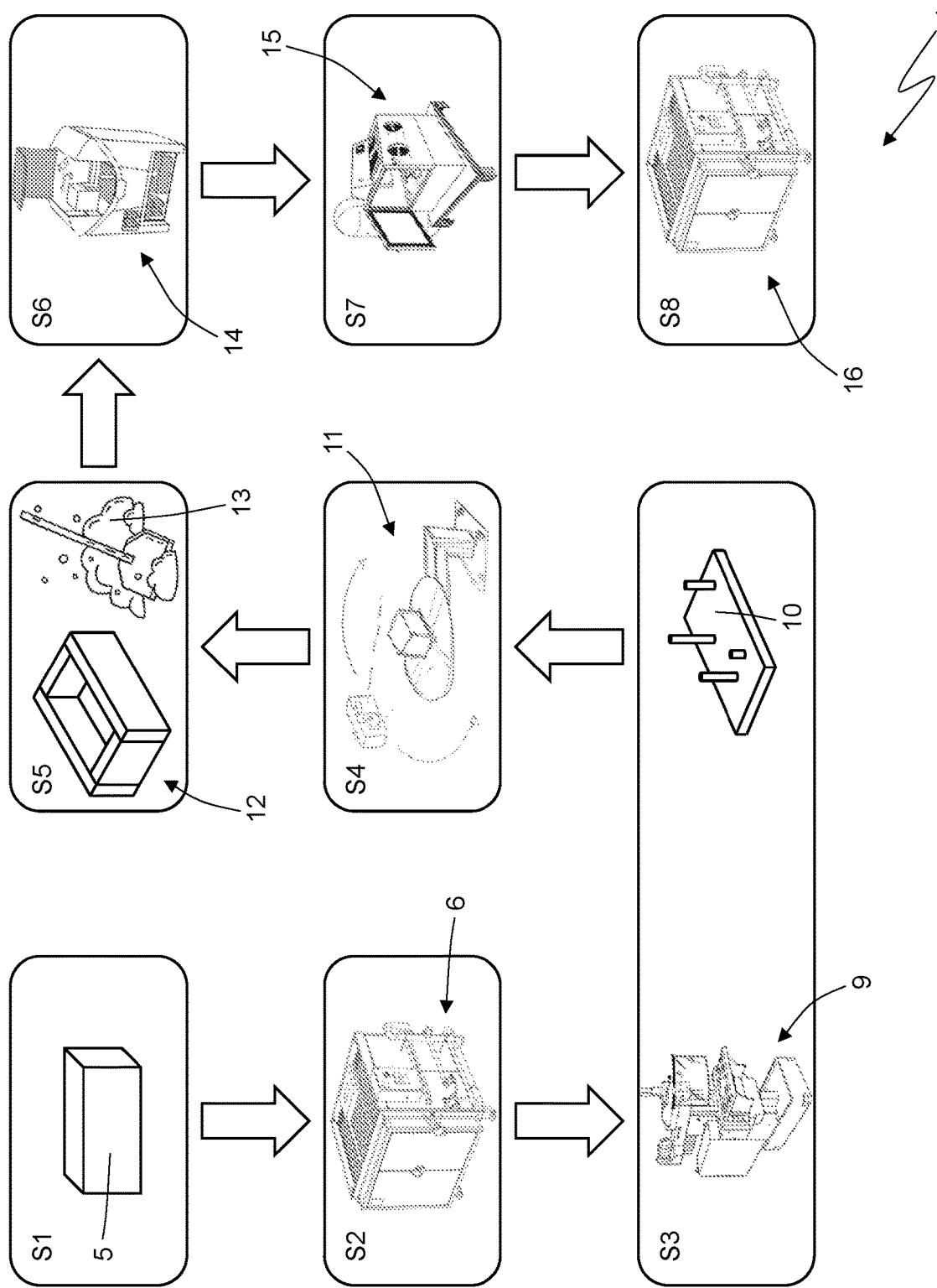
FIG. 3 is a schematic view of a production unit where the cylinder head of FIG. 1 is manufactured.

In FIG. 3, number 4 indicates, as a whole, a production plant designed to produce the cylinder head 1.

The production plant 1 comprises a casting station S1 provided with a casting bench (namely, a die casting machine) comprising a mould 5, which can be opened and reproduces in negative the shape of the sole main part 2 of the cylinder head 1. In the casting station S1, the sole main part 2 of the cylinder head is manufactured by means of a casting process, for example a gravity or low-pressure casting into the mould 5; namely, a feeding device feeds into the mould 5 a predetermined quantity of molten metal, which, by hardening inside the mould 5, produces the main part 2 of the cylinder head 1. Subsequently, after the hardening of the molten metal, the mould 5 is opened in order to remove the main part 2 of the cylinder head 1 in a partly finished state. After the extraction of the main part 2 of the cylinder head 1 in the partly finished state from the mould 5, excess parts are removed (namely, residues of the casting process, such as risers and flashes).

The production plant 1 comprises a treatment station S2 provided with an industrial furnace 9, where the main part 2 of the cylinder head 1 undergoes a thermal quenching and ageing treatment (before starting to manufacture the operating part 3 of the cylinder head 1 by means of additive manufacturing, as described below).

The production plant 1 comprises a processing and mounting station S3, where, by means of a machine tool 6, the main part 2 of the cylinder head 1 in the partly finished state is subjected to mechanical processing (said mechanical processing being carried out after the thermal treatment in the treatment station S2); in particular, at first, a lower face 7 (shown in FIG. 2) of the main part 2 is subjected to flattening by means of a mechanical chip-removal machining so as to allow the lower face 7 to gain a predetermined surface roughness and, subsequently, an upper face 8 (shown in FIG. 2) of the main part 2 (which is parallel to and opposite the lower face 7) is subjected to flattening by means of a mechanical chip-removal machining so as to allow the upper face 8 to gain a predetermined surface roughness.

Before starting to manufacture the operating part 3 of the cylinder head 1 by means of additive manufacturing, as explained below, the lower face 7 of the main part 2 is flattened by means of a mechanical chip-removal machining (for example, by means of milling) so as to allow the lower face 7 to gain a predetermined surface roughness, which is relatively small.

According to a preferred embodiment, during the mechanical processing of the main part 2, the processing and mounting station S3 allows geometric references (for example, holes or threaded holes, which go through the lower face 7 of the main part 2) to be obtained in the main part 2.

Once the processing of the lower face 7 of the main part 2 (including the creation of the geometric references) has ended, the main part 2 of the cylinder head 1 is coupled to an adjusted support plate 10, which constitutes a position reference for the subsequent additive manufacturing; namely, the main part 2 of the cylinder head 1 is laid on and constrained to the support plate 10 in a predetermined position. Obviously, the lower face 7 of the main part 2 is the one directly in contact with the support plate 10 and, therefore, the lower face 7 of the main part 2 preferably has to be smooth (due to the mechanical processing previously carried out), so as to make the coupling between the main part 2 and the support plate 10 more stable. According to a possible embodiment, the support plate 10 has striker bodies, which vertically project from the support plate 10 and are designed to engage corresponding cavities (coinciding or not coinciding with the previously created geometric references) available in the main part 2 of the cylinder head 1 (namely, said cavities can be manufactured especially for the coupling to the support plate 10 or can naturally be present in the main part 2); in this way, a better and more stable coupling between the main part 2 and the support plate 10 is ensured.

The geometric references obtained in the main part 2 (and, in particular, through the lower face 7 of the main part 2) facilitate and improve (make more precise) the coupling of the main part 2 to the support plate 10.

Once the main part 2 has been fitted on the support plate 10 and before starting to manufacture the operating part 3 of the cylinder head 1 by means of additive manufacturing, as explained below, the upper face 8 of the main part 2 is flattened by means of a mechanical chip-removal machining (for example, by means of milling) so as to allow the upper face 8 to gain a predetermined surface roughness, which can be small or not too small so as to improve the subsequent adhesion of the operating part 3 of the cylinder head 1. Namely, generally speaking, the surface roughness of the upper face 8 is greater than the surface roughness of the lower face 7 since the lower face 7 has to firmly adhere to the support plate 10, whereas the operating part 3 of the cylinder head 1 has to be printed on the upper face 8 by means of additive manufacturing.

In other words, between the processing of the lower face 7 of the main part 2 and the processing of the upper face 8 of the main part 2, the main part 2 is fitted on the support plate 10 by laying the lower face 7 of the main part 2 on the support plate 10. According to a different embodiment, both the processing of the lower face 7 of the main part 2 and the processing of the upper face 8 of the main part 2 are carried out before fitting the main part 2 on the support plate 10 by laying the lower face 7 of the main part 2 on the support plate 10 (obviously, a correct planarity needs to be ensured for the subsequent printing process through additive manufacturing).

The production plant 1 comprises a measuring station S4 provided with a three-dimensional scanner 11, which (before starting to manufacture the operating part 3 of the cylinder head 1 by means of additive manufacturing, as described below) carries out a three-dimensional scanning of the main part 2 (fitted on the support plate 10) in order to obtain an actual three-dimensional profile of the main part 2; namely, thanks to the three-dimensional scanning, the actual dimensions and shape of the main part 2 can be reconstructed net of constructive tolerances. The design of the operating part 3 is preferably adjusted (for example heated and/or deformed) to the actual three-dimensional profile of the main part 2; obviously, the adjustments are limited and amount to less than a few millimetres, but, anyway, they subsequently allow for an almost perfect coupling between the main part 2 of the cylinder head 1 and the operating part 3 of the cylinder head 1.

The production plant 1 comprises a filling station S5, where the main part 2 (fitted on the support plate 10) is inserted into a cup-shaped container 12, which is open at the top and has a (more or less) parallelepiped-like shape; the support plate 10 preferably constitutes a base of the container 12 (delimits the container 12 at the bottom), namely the container 12 is obtained by coupling the support plate 10 to four vertical side walls. The container 12 is sized so as to house, on the inside, the main part 2 with a small clearance, namely trying to minimize the volume that remains free inside the container 12 once the main wall 2 is inserted. Subsequently and before starting to manufacture the operating part 3 of the cylinder head 1 by means of additive manufacturing, as described below, all holes or cavities opening through the upper face 8 of the main part 2 are filled using a metal powder 13, which is the same metal powder 13 that will be used by the subsequent additive manufacturing; the function of the container 12 is that of laterally containing the metal powder 13 used to fill all holes or cavities opening through the upper face 8 of the main part 2.

Basically, just outside the filling station S5 there is a powder bed 13 (flush with the upper face 8 of the main part 2), on which layer upon layer can be deposited by means of additive manufacturing.

According to a possible embodiment, the filling by means of powder 13 in the filling station takes place in a controlled (modified) atmosphere, in which air is replaced by an inert gas (for example, argon).

The production plant 1 comprises an additive manufacturing station S6 comprising an additive manufacturing machine 14, which operates according to the additive manufacturing process called PBF ("Powder Bed Fusion") and, hence, uses thermal energy to melt specific points in a previously deposited metal powder layer 13; in particular, the thermal energy—produced by a laser source—melts the metal powder 13, which, by cooling down, solidifies and, by so doing, each part of the operating part 3 is manufactured. Therefore, the operating part 3 is manufactured starting from a layer design, with a process that is repeated layer after layer in order to obtain the final shape. After the fusion of a layer (level), a building platform housing the support plate 10 is lowered, a recoater deposits a new layer of metal powder 13 and the procedure is repeated.

The main part 2 of the cylinder head 1 (fitted on the support plate 10, housed in the container 12, and filled with powder 13) is inserted in the additive manufacturing machine 14 in order to manufacture the operating part 3 of the cylinder head 1 by means of additive manufacturing, which adds layer upon layer of metal powder 13 starting from the previously manufactured main part 2 of the cylinder head 1; namely, the operating part 3 of the cylinder head 1 is built layer by layer directly on top of the main part 2 (previously manufactured by means of casting). To this regard, it should be pointed out that the additive manufacturing process called PBF cannot add a powder layer 13 on an void and, for this reason, all holes and cavities opening through the upper face 8 of the main part 2 are previously and temporarily filled using the metal powder 13: in this way, the main part 2 (temporarily) has a solid and levelled surface, in which the operating part 3 of the cylinder head 1 can be built layer after layer.

The container 12 could comprise filling elements, which project from the support plate 10 or from the side walls (namely project towards the inside of the container 12) and reproduce in negative the outer shape of the main part 2 of the cylinder head 1, in order to reduce the quantity of powder 13 needed to fill the container 12 (best case scenario, in order to completely eliminate the filling with metal powder 13 before the beginning of the additive manufacturing process). These filling elements (mounted on the support plate 10 or on the side walls of the container 12) could also be movable (in one single direction or in different directions perpendicular to one another) in order to move close to/away from the main part 2 of the cylinder head 1 arranged inside the container 12; the movement of the filling elements is functional both in order to allow the main part 2 to be inserted into/removed from the container 12 (namely, the filling elements move away in order to create the "manoeuvring space" needed to move the main part 2) and in order to make up for constructive tolerances of the main part 2 (i.e. in order to adjust to a slightly larger or slightly smaller main part 2 compared to the nominal dimension).

It should be pointed out that the main part 2 of the cylinder head 1 could be designed so as to avoid (or at least limit) the presence of holes or cavities opening through the upper face 8, in order to simplify the subsequent building of the operating part 3.

In the preferred, though non-binding embodiment shown in the accompanying figures, an additive manufacturing process called PBF is used, which requires the use of metal powder 13; according to other embodiments, other additive manufacturing process could be used, which do not require the use and the presence of metal powder 13, such as, for example, the additive manufacturing process called BIM ("Binder Injection Moulding"), the additive manufacturing process called MIM ("Metal Injection Molding") or the additive manufacturing process called LC ("Laser Cladding"). Obviously, since the additive manufacturing process called PBF is no longer used, the presence of the container 12 and of the metal powder 13 (hence, the presence of the filling station S5 and of the cleaning station S7) is no longer needed.

The production plant 1 comprises a cleaning station S7 provided with a cleaning machine 15: once the manufacturing of the operating part 3 has ended, the cylinder head 1 is complete, is extracted from the container 12, is removed from the support plate 10 and is inserted in the cleaning machine 15 in order to be cleaned, in particular by removing the powder 13 deposited for the printing of the operating part 3 and by removing the powder 13 previously used to temporarily close all holes or cavities opening through the upper face 8 of the main part 2. The cleaning machine 15 uses suctions to remove the powder 13, but it could also carry out a final cleaning of the cylinder head 1 by means of sandblasting, ultrasound or chemical washing. Obviously, possible printing supports have to be (manually or automatically) removed before carrying out the cleaning (sandblasting) of the cylinder head 1.

The production plant 1 could also comprise a treatment station S8 provided with an industrial furnace 16, in which the cylinder head 1 (now complete with both parts 2 and 3) is subjected to a thermal stress relieving treatment.

After the (possible) treatment station S8, the head 1 is ready for the different quality controls and for the subsequent mechanical processing needed to obtain the final result.

According to a possible embodiment, before starting to manufacture the operating part 3 of the cylinder head 1 by means of additive manufacturing (and, in particular, immediately before the filling station, namely before adding the powder 13 to the main part 2), there could be a deoxidization of the upper face 8 of the main part 2, namely a chemical treatment to eliminate all superficial oxides from the upper face 8 of the main part 2. Said deoxidization of the upper face 8 of the main part 2 is aimed at improving the adhesion of the initial layers of the operating part 3 to the upper face 8 of the main part 2.

According to a possible embodiment, before starting to manufacture the operating part 3 of the cylinder head 1 by means of additive manufacturing (and, in particular, when the main part 2 already is inside the additive manufacturing machine 14), there could be a heating of the upper face 8 of the main part 2, for example using infrared lamps; said heating of the upper face 8 of the main part 2 is aimed at improving the adhesion of the initial layers of the operating part 3 to the upper face 8 of the main part 2.

According to a possible embodiment, the main part 2 of the cylinder head 1 is manufactured by means of gravity casting using a first metal alloy (typically, an aluminium-based alloy, for example an A354 or A356 alloy) and the operating part 3 of the cylinder head 1 is manufactured by means of additive manufacturing using a second metal alloy (typically, an aluminium-based alloy, for example an A6061, AlSi9Cu3 or AlSi10Mg alloy), which is different from the first metal alloy and is compatible with the first metal alloy (namely, is capable of firmly adhering to the first metal alloy and, in use, has the same thermal expansion as the first metal alloy). In this way, each metal alloy can be optimized for the stresses to which it will be subjected in use; indeed, the main part 2 of the cylinder head 1 is subjected, in use, to high mechanical and thermal stresses deriving from the combustion taking place in the cylinders (the main part 2 of the cylinder head 1 makes up the crown of the cylinders, since it comprises the flame deck), whereas the operating part 3 of the cylinder head 1 is subjected, in use, to much smaller mechanical and thermal stresses.

According to a different embodiment, both parts 2 and 3 of the cylinder head 1 are manufactured by means of the same metal alloy (typically, an aluminium-based alloy)

The embodiments described herein can be combined with one another, without for this reason going beyond the scope of protection of the invention.

The production method described above has different advantages.

First of all, the production method described above allows manufacturers to obtain a cylinder head 1 that, at the same time, is both very light and very resistant. This result is obtained thanks to the fact that the main part 2 of the cylinder head 1 is manufactured with a traditional casting process, which ensures a high resistance (besides, the main part 2 of the cylinder head 1 would not particularly benefit from being manufactured by means of additive manufacturing because, since it has to resist high mechanical and thermal stresses, it necessarily has to have thick walls and not too complex geometries), whereas the operating part 3 of the cylinder head 1 is manufactured by means of additive manufacturing, which allows for very complex geometries and small thickness, in order to maximize lightness.

Furthermore, the fact that the casting process is used to manufacture a piece that is significantly smaller than usual (namely, the sole main part 2 of the cylinder head 1, which approximately is a little more than half the total volume of the cylinder head 1) generates, in the main part 2 of the cylinder head 1, a greater mechanical resistance than usual; indeed, by decreasing the quantity of molten metal to be fed into the mould 5, the solidification time decreases, hence increasing the final mechanical resistance.

In other words, the production method described above better combines the best (namely, the strong suits) of the two production technologies (casting and additive manufacturing), eliminating the worst (namely, the weaknesses) of the two production technologies.

Indeed, casting is the ideal production technology to manufacture the main part 2 of the cylinder head 1, for it ensures high mechanical feature values even in the presence of high temperatures. On the other hand, additive manufacturing is the ideal production technology to manufacture the operating part 3 of the cylinder head 1, for is ensures complex and lighter geometries compared to a traditional design as well as casting walls for the different cores with very limited thicknesses and hard to be obtained; furthermore, in order to obtain these geometries during the casting process, activities would be necessary, which are complicated and problematic to be handled and are known as "mould making" and "core assembling", namely activities of filling and extraction of sand moulds from the equipment, which are then assembled in order to obtain the "negative" of the desired shape.

Furthermore, by manufacturing the sole operating part 3 of the cylinder head 1 by means of additive manufacturing (which is a slow production technique, in which the larger the pieces to be manufactured, the slower the technique), the production of the cylinder head 1 requires more time compared to the production by means of sole casting, but this time extension is not excessive.

The operating part 3 manufactured by means of additive manufacturing is preferably designed, from the very beginning, with the aim of lightening and optimizing the printing process (the so-called "design for additive manufacturing"), thus reducing printing times, reducing the weight of the article as a whole and optimizing the production process. Indeed, by designing the operating part 3 in view of an additive production, it is possible to minimize, from the start, the supports needed for the printing process (namely, the material that is discarded and removed during the article cleaning phase), which constitute lost molten powder.

Finally, the production method described above is simple and economic to be implemented, since it only uses commercial production and processing technologies.

LIST OF THE REFERENCE NUMBERS OF THE FIGURES

1 cylinder head
2 main part
3 operating part
4 production plant
5 mould
6 machine tool
7 lower face
8 upper face
9 industrial furnace
10 support plate
11 three-dimensional scanner
12 container
13 powder
14 additive manufacturing machine
15 cleaning machine
16 industrial furnace
S1 casting station
S2 treatment station
S3 processing and mounting station
S4 measuring station
S5 filling station
S6 additive manufacturing station
S7 cleaning station
S8 treatment station

The invention claimed is:

1. A method for the production of a cylinder head (1) for an internal combustion engine including a plurality of cylinders, the cylinder head (1) including a flame deck making up a crown of each cylinder and housing of control means for valves, the production method comprises the steps of:
dividing a design of the cylinder head (1) into designing a main part (2) comprising the flame deck making up the crown of each cylinder and designing an operating part (3) comprising the housings of the control means for valves;
manufacturing only the main part (2) of the cylinder head (1) comprising an upper face (8) by means of a casting process in a mould (5); and
manufacturing, subsequently, the operating part (3) of the cylinder head (1) by means of additive manufacturing, which adds layer upon layer starting from the upper face (8) of the previously manufactured main part (2) of the cylinder head (1).

2. The production method according to claim 1, wherein:
the operating part (3) of the cylinder head (1) is manufactured by means of an additive manufacturing process called PBF, which adds layer upon layer of a metal powder (13); and
the upper face (8) of the main part (2) manufactured by the casting process comprises a plurality of holes or cavities;
before starting to manufacture the operating part (3) of the cylinder head (1) by means of additive manufacturing, there is provided the further step of filling all the holes or cavities opening in the upper face (8) of the main part (2) by using the same metal powder (13) used for the additive manufacturing.

3. The production method according to claim 2 and comprising, after having manufactured the operating part (3) of the cylinder head (1) by means of additive manufacturing, the further step of removing the metal powder (13) left in the main part (2) of the cylinder head (1) and the metal powder (13) deposited during the following additive manufacturing process.

4. The production method according to claim 2 and comprising, before starting to manufacture the operating part (3) of the cylinder head (1) through additive manufacturing, the further step of inserting the main part (2) into a cup-shaped container (12), which is open at the top and laterally contains the metal powder (13) used to fill the holes or cavities opening in the upper face (8) of the main part (2).

5. The production method according to claim 4 and comprising, before starting to manufacture the operating part (3) of the cylinder head (1) through additive manufacturing, the further step of laying the main part (2) on and binding it to a support plate (10), which is a position reference for the additive manufacturing and delimits the container (12) at the bottom.

6. The production method according to claim 4, wherein the container (12) comprises at least one filling element, which projects towards the inside of the container (12).

7. The production method according to claim 6, wherein the filling element is movable relative to the container (12) so as to get close to/away from the main part (2) of the cylinder head (1) placed inside the container (12).

8. The production method according to claim 1 and comprising, before starting to manufacture the operating part (3) of the cylinder head (1) by means of additive manufacturing, the further step of flattening the upper face (8) of the main part (2) by means of a mechanical chip-removal machining so as to allow the upper face (8) to gain a predetermined surface roughness.

9. The production method according to claim 1 and comprising, before starting to manufacture the operating part (3) of the cylinder head (1) by means of additive manufacturing, the further step of deoxidizing the upper face (8) of the main part (2).

10. The production method according to claim 1 and comprising, before starting to manufacture the operating part (3) of the cylinder head (1) by means of additive manufacturing, the further step of heating the upper face (8) of the main part (2).

11. The production method according to claim 1 and comprising, before starting to manufacture the operating part (3) of the cylinder head (1) by means of additive manufacturing, the further steps of: carrying out a 3D scanning of the main part (2) in order to obtain an actual 3D profile of the main part (2); and adjusting a design of the operating part (3) to the actual 3D profile of the main part (2).

12. The production method according to claim 1 and comprising, before starting to manufacture the operating part (3) of the cylinder head (1) through additive manufacturing, the further step of laying the main part (2) of the cylinder head (1) on and binding it to a support plate (10), which is a position reference for the additive manufacturing.

13. The production method according to claim 12, wherein the support plate (10) has striker bodies, which vertically project from the support plate (10) and are designed to engage corresponding cavities present in the main part (2) of the cylinder head (1).

14. The production method according to claim 12 and comprising, before laying the main part (2) of the cylinder head (1) on and binding it to the support plate (10), the further step of flattening a lower face (7) of the main part (2) by means of a mechanical chip-removal machining so as to allow the lower face (7) to gain a predetermined surface roughness.

15. The production method according to claim 12 and comprising the further step of making, in the main part (2) of the cylinder head (1), geometric references, which are used to couple the main part (2) to the support plate (10).

16. The production method according to claim 15, wherein the geometric references are holes or threaded holes opening in a lower face (7) of the main part (2).

17. The production method according to claim 1 and comprising, before starting to manufacture the operating part (3) of the cylinder head (1) by means of additive manufacturing, the further step of subjecting the main part (2) of the cylinder head (1) to a thermal quenching and ageing treatment.

18. The production method according to claim 1 and comprising, after having manufactured the operating part (3) of the cylinder head (1) by means of additive manufacturing, the further step of subjecting the cylinder head (1) to a thermal stress relieving treatment.

19. The production method according to claim 1, wherein the main part (2) of the cylinder head (1) is manufactured by means of casting using a first metal alloy and the operating part (3) of the cylinder head (1) is manufactured by means of additive manufacturing using a second metal alloy, which is different from the first metal alloy.

* * * * *